United States Patent
Mohan et al.

(10) Patent No.: US 8,938,229 B1
(45) Date of Patent: *Jan. 20, 2015

(54) ALLEVIATING AND OVERRIDING THROTTLED CONDITIONS IN LTE

(71) Applicant: Sprint Communications Company L.P., Overland Park, KS (US)

(72) Inventors: David Mohan, Overland Park, KS (US); Munawar Uddin, Naperville, IL (US); Saravana Kumar Velusamy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,110

(22) Filed: May 23, 2014

Related U.S. Application Data

(63) Continuation of application No. 13/569,334, filed on Aug. 8, 2012, now Pat. No. 8,774,824.

(51) Int. Cl.
  *H04W 24/00* (2009.01)
  *H04W 28/02* (2009.01)
  *H04W 24/04* (2009.01)
  *H04W 12/06* (2009.01)

(52) U.S. Cl.
  CPC .......... *H04W 28/0289* (2013.01); *H04W 24/04* (2013.01); *H04W 12/06* (2013.01)
  USPC .......................................................... 455/423

(58) Field of Classification Search
  USPC ........................................................ 455/423
  See application file for complete search history.

(56) References Cited

U.S. PATENT DOCUMENTS

| | | | |
|---|---|---|---|
| 8,019,331 B2 * | 9/2011 | Khetawat et al. | 455/422.1 |
| 8,718,655 B2 * | 5/2014 | Dominguez Romero et al. | 455/445 |
| 2013/0040608 A1 * | 2/2013 | Piercy et al. | 455/411 |
| 2013/0336283 A1 * | 12/2013 | Wong et al. | 370/331 |

* cited by examiner

*Primary Examiner* — Nathan Mitchell

(57) ABSTRACT

Systems, methods, and computer-readable media for alleviating and overriding throttled conditions in Long Term Evolution networks are provided. In embodiments, indications that throttled conditions have been reached are received at Mobile Management Entities. Cause codes are communicated, in embodiments, to mobile devices directing the mobile devices to refrain from further attach attempts. In embodiments, attach attempts associated with unique identifiers are received by the Mobile Management Entities that override throttled conditions. In embodiments, authentication failure conditions from the Mobile Management Entities are detected. Algorithms are invoked, in embodiments, to initiate cell barring modes for base stations and detect failure percentages.

19 Claims, 4 Drawing Sheets

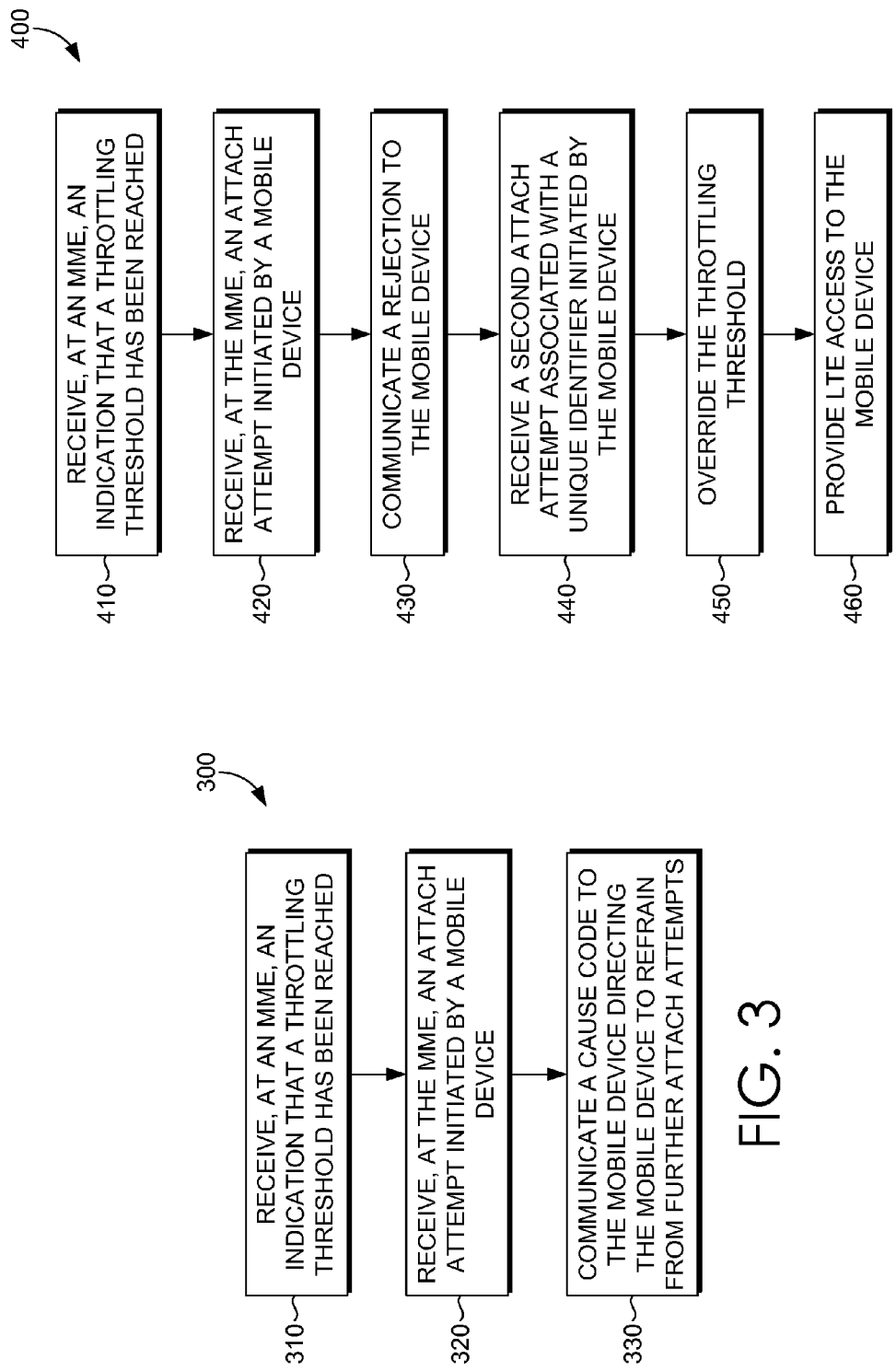

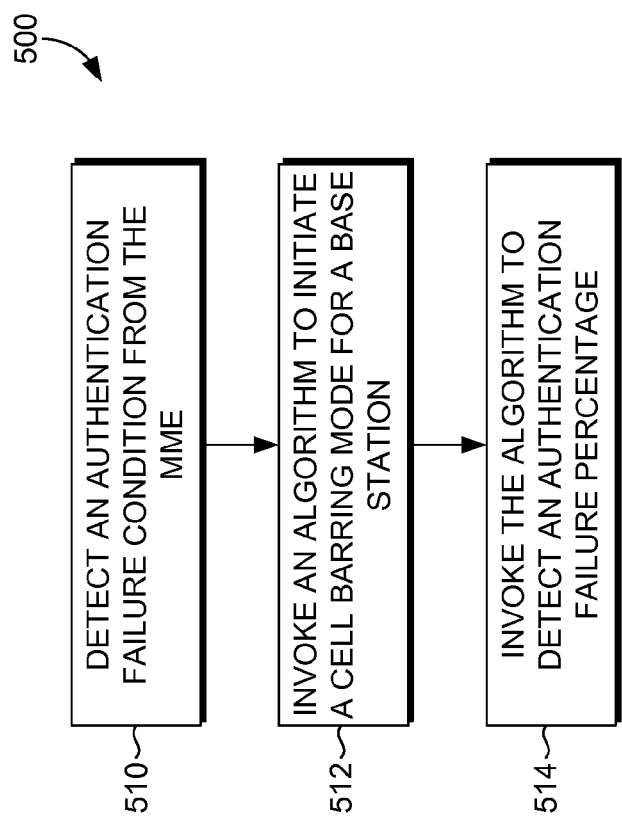

ALLEVIATING AND OVERRIDING THROTTLED CONDITIONS IN LTE

CROSS-REFERENCE TO RELATED APPLICATIONS

This application is a continuation of U.S. application Ser. No. 13/569,334, filed Aug. 8, 2012, which is hereby incorporated by reference in its entirety.

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, providing alleviating and overriding throttled conditions in long term evolution (LTE) networks. In embodiments, cause codes are communicated to mobile devices directing the mobile devices to refrain from further attach attempts. In embodiments, attach attempts associated with unique identifiers are received that override throttled conditions. In embodiments, authentication failure conditions are detected and algorithms are invoked to initiate cell barring modes for base stations.

BRIEF DESCRIPTION OF THE SEVERAL VIEWS OF THE DRAWINGS

Illustrative embodiments of the present invention are described in detail below with reference to the attached drawing figures, and wherein:

FIG. 3 is a flow diagram depicting an illustrative method of preventing a registration storm in an LTE network, in accordance with embodiments of the invention; and FIG. 4 is a flow diagram depicting an illustrative method of overriding throttled conditions in an LTE network, in accordance with embodiments of the invention; and FIG. 5 is a flow diagram depicting an illustrative method of preventing a registration storm in an LTE network, in accordance with embodiments of the invention.

DETAILED DESCRIPTION

Figure 1:
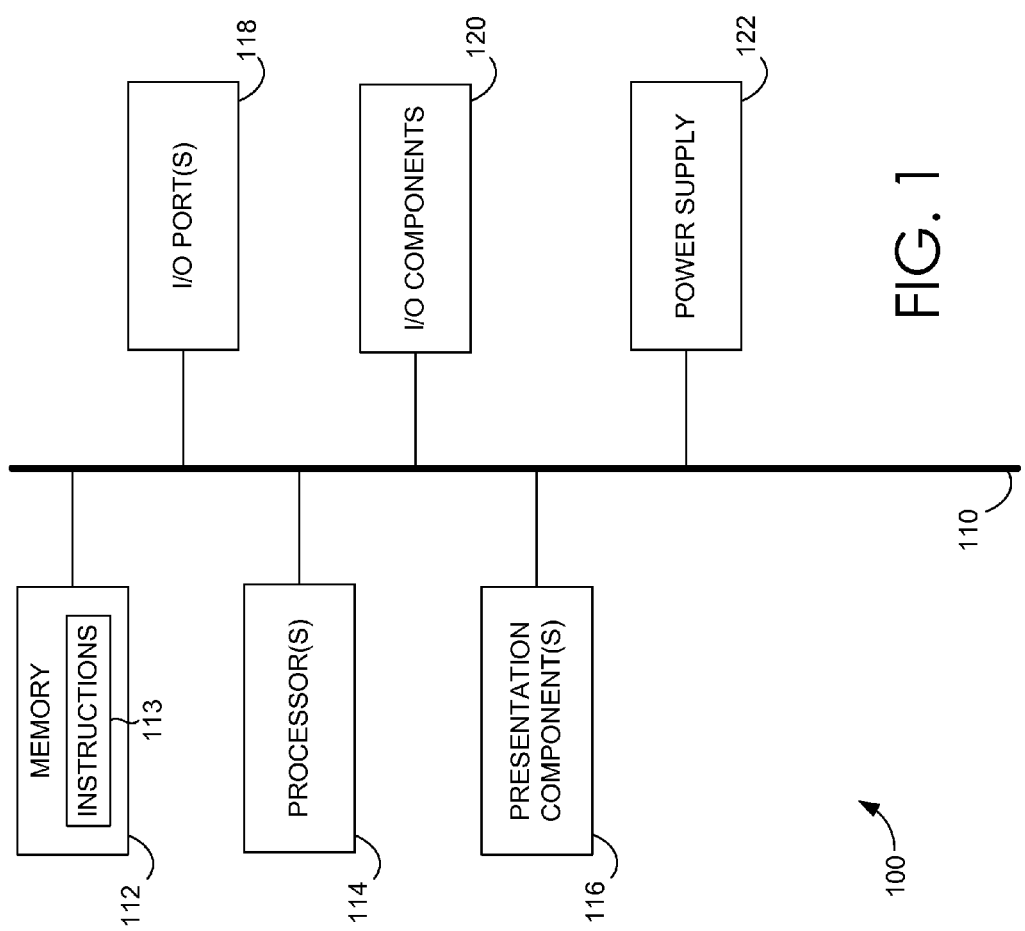
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention are directed to redirect devices to available services during registration storms. Embodiments of the present invention detect high profile customers allowing network access during network congestion situations. Embodiments of the present invention prevent registration storms by disabling LTE networks.

Accordingly, in one aspect, embodiments of the present invention are directed to computer-storage media having computer-executable instructions embodied thereon that, when executed, facilitate a method of preventing a registration storm in an LTE network. The method includes receiving, at a Mobile Management Entity (MME), an indication that a throttling threshold has been reached. An attach attempt initiated by a mobile device is received at the MME. A cause code is communicated to the mobile device directing the mobile device to refrain from further attach attempts.

In another aspect, embodiments of the present invention are directed to one or more computer-storage media having computer-executable instructions embodied thereon that, when executed, facilitate a method of overriding throttled conditions in an LTE network. The method includes receiving, at an MME, an indication that a throttling threshold has been reached. An attach attempt initiated by a mobile device is received at the MME. A rejection is communicated to the mobile device. A second attach attempt associated with a unique identifier and imitated by the mobile device is received. The throttling threshold is overridden.

In yet another aspect, embodiments of the present invention are directed to computer-storage media having computer-executable instructions embodied thereon that, when executed, facilitate a method of preventing a registration storm in an LTE network. The method includes detecting an authentication failure condition from the MME. An algorithm to initiate a cell barring mode for a base station is invoked. The algorithm is further invoked to detect an authentication failure percentage.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
CRM Customer Relations Management
DVD Digital Versatile Discs
EEPROM Electrically Erasable Programmable Read Only Memory
ENODEB Evolved Node B
EVDO Evolution Data Only (Optimized)
GPRS General Packet Radio Service
GPS Global Positioning System
GSM Global System for Mobile Communications
HLR Home Location Register
HSS Home Subscriber Server
iDEN Integrated Digital Enhanced Network
LTE Long Term Evolution
MME Mobile Management Entity
MMS Multimedia Messaging Service
MSC Mobile Serving Center
PC Personal Computer
PCRF Policy Charging and Rules Function PCS Personal Communications Service
PDA Personal Digital Assistant
PLMN Public Land Mobile Network
RAM Random Access Memory
RF Radio Frequency
ROM Read Only Memory
SIB2 SystemInformationBlockType2
SLA Service Level Agreement
SMS Short Message Service
SPS Semi-Persistent Scheduling
TDMA Time Division Multiple Access
UMTS Universal Mobile Telecommunications Systems
VoIP Voice over IP
Wi-Fi Wireless Fidelity
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
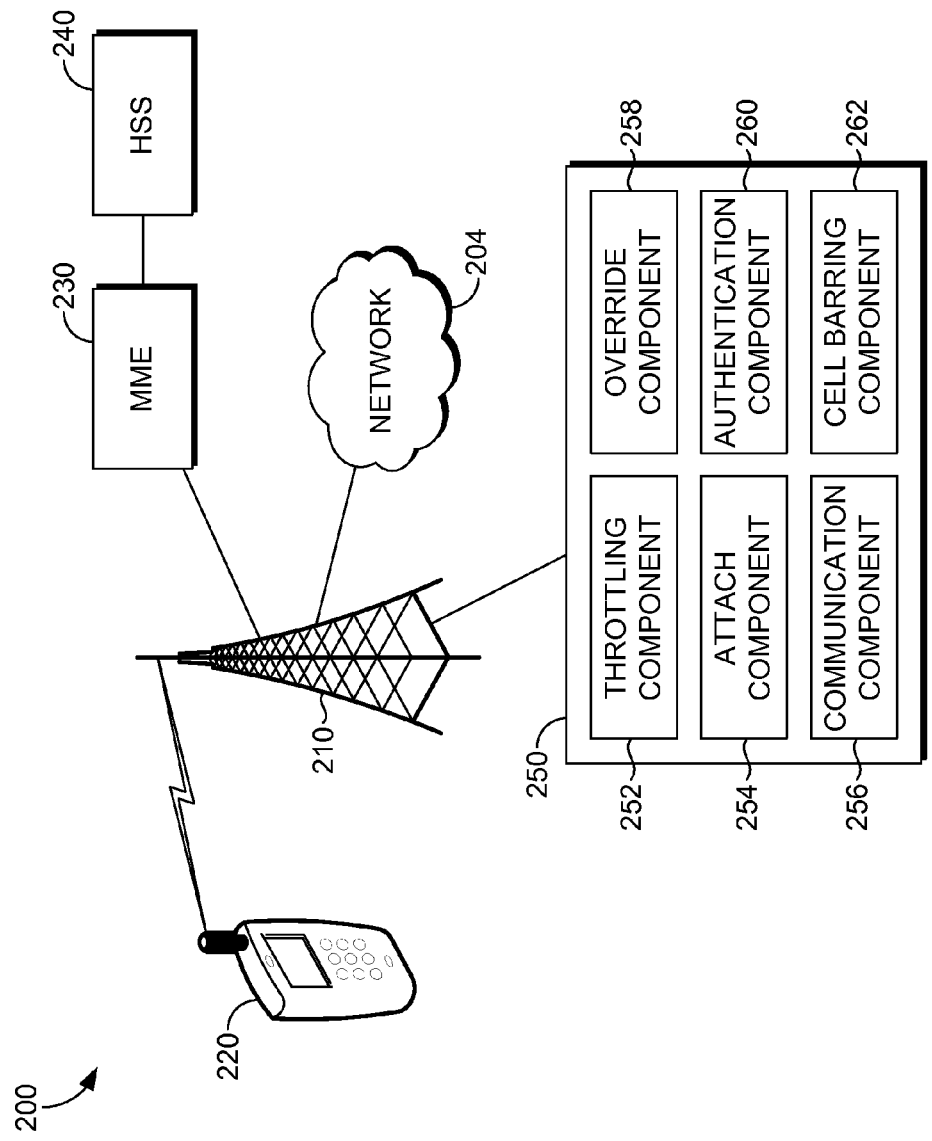
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 220 may communicate with other devices, such as mobile devices, servers, etc. The user device 220 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 220 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 220 can utilize network 204 to communicate with other computing devices (e.g., a mobile device(s), a server(s), a personal computer(s), etc.). In embodiments, the network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. The network 204 can be part of a telecommunication network that connects subscribers to their immediate service provider. In embodiments, the network 204 can be associated with a telecommunications provider that provides services to user devices, such as user device 220. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

In LTE networks, the base station 210 controls user access to the network 204. Mobile devices 220 waking up from an idle mode attempt to attach to an MME 230 for authentication. An MME is able to authenticate devices for multiple base stations. For example, an MME may be associated with five thousand base stations, each base station associated with more than one million mobile devices. In some embodiments, each base station may be associated with more than one MME in a clustered environment. In some embodiments, each base station may be associated with one or more backup or failover MMEs.

Once a mobile device 220 attempts to attach to an MME 230, the MME 230 queries the HSS 240 to get a user profile associated with the mobile device 220 for authorization. If the user profile is authorized, the MME 230 responds with a key exchange process in order to validate the mobile device 220.

In implementation, the base station is associated with components that are utilized to alleviate and override throttled conditions in an LTE network. The components include throttling component 252, attach component 254, communication component 256, override component 258, authentication component 260, and cell barring component 262. Although each of these components are illustrated as one system 250 associated with the base station 210, it should be appreciated that any or all of these components may be associated with any of the network elements, including the MME 230 and HSS 240.

Throttling component 222, in one embodiment, receives an indication that a throttling threshold has been reached. The throttling threshold prevents various network elements from being overloaded, such as during network congestion. Thus, during these conditions, traffic between MME 230 and HSS 240 is limited to a percentage of capacity, or throttling threshold to protect the network elements.

Attach attempts received, in one embodiment, by attach component 224. In one embodiment, attach component 224 is associated with the MME 230. In another embodiment, attach component 224 receives the attach attempts and then communicates them to the MME 230.

If the LTE network is in a throttled condition, in one embodiment, communication component 256 communicates a cause code to the mobile device. In ordinary circumstances, when a mobile device 220 attempts to attach to the MME 230 and is rejected, the mobile device waits approximately ten seconds and then attempts to attach to the MME 230 again. This process continues until the mobile device 220 is successful. Unfortunately, these continued attempts, particularly when the network 204 is congested, result in a registration storm.

To prevent this situation, the cause code directs the mobile device 220 to refrain from further attach attempts. The cause code, in one embodiment, redirects the mobile device 220 to connect to an available service. For example, rather than continuing to attempt connections to the LTE network, the mobile device is redirected to a non-LTE service such as EVDO or Wi-Fi. This allows the mobile device 220 to maintain service. If a non-LTE service is not available, the cause code is associated with a timer, in one embodiment, that prevents attach attempts for a predetermined amount of time.

In addition, redirecting the mobile device allows the LTE network elements to avoid becoming overloaded which could degrade the network performance, or bring down one or more of the network elements. Instead, mobile devices 220 refrain from connecting to the network until throttling component 252 determines that congestion has decreased to an acceptable level and the throttling threshold is no longer reached or exceeded. In one embodiment, once the mobile device enters the idle mode, the cause code expires. In this example, the next time the mobile device 220 wakes from the idle mode, the mobile device 220 will once again to attempt to connect to the LTE network.

In one embodiment, override component 258 overrides the throttling threshold. For example, a high profile or high paying user may be associated with the mobile device 220 attempt to attach to MME 230. In another example, the mobile device 220 may be a special device (e.g. machine-to-machine). After the initial rejection is communicated to the mobile device 220, a second attach attempt transmitted by the mobile device 220 is received by attach component 254. The second attach attempt is associated with a unique identifier that overrides the throttling threshold. In one embodiment, the unique identifier is associated with an upper throttling threshold rather than the throttling threshold. The upper throttling threshold allows additional attach attempts even when the throttling threshold has been reached.

In one embodiment, authentication component 260 detects authentication failures from the MME 230. If the authentication failure rate meets or exceeds a predetermined threshold, cell barring component 262 causes the base station 210 to enter a cell barring mode. The cell barring mode prevents new user access attempts. Once the authentication failure rate has decreases sufficiently, or to below the predetermined threshold, cell barring component 262 removes the base station 210 from the cell barring mode.

Referring now to FIG. 3, a flow diagram depicts an illustrative method 300 of preventing a registration storm, in accordance with embodiments of the invention. At step 310, an indication is received, at an MME, that a throttling threshold has been reached. The throttling threshold helps to limit the load of mobile devices registered by the LTE network to a predetermined and configurable percentage of capacity to protect various network elements. An attach attempt initiated by a mobile device is received at step 320.

A cause code is communicated, at step 330, to the mobile device directing the mobile device to refrain from further attach attempts. In one embodiment, the cause code redirects the mobile device to connect to an available service. In one embodiment, the available service is EVDO. In one embodiment, the available service is Wi-Fi. In one embodiment, the available service is a backup MME. The backup MME may be part of an MME cluster or a standalone MME that operates as a failover.

In one embodiment, the cause code protects network elements associated with the MME. For example, in order not to overload the Home Subscriber Servers (HSS), Policy Charging and Rules Function (PCRF), and Semi-Persistent Scheduling (SPS) platforms, the cause code directs the mobile device to refrain from further attach attempts. This prevents additional traffic between the MME and other network elements, including the HSS, PCRF, and SPS, that may already be experiencing degraded performance due to congestion issues.

In one embodiment, the cause code expires once the mobile device enters an idle mode. The next time the mobile device enters the active mode, the mobile device automatically attempts to connect to the LTE network again and the MME receives another attach attempt initiated by the mobile device. If the throttling threshold is no longer exceeded, indicating the registration storm condition has passed, the mobile device may connect to the LTE network.

Referring now to FIG. 4, a flow diagram depicts an illustrative method 400 of overriding throttled conditions in an LTE network, in accordance with an embodiment of the present invention. Initially, at step 410, an indication that a throttling threshold has been reached is received at an MME. The throttling threshold helps to limit the load of mobile devices registered by the LTE network to a predetermined and configurable percentage of capacity to protect various network elements. An attach attempt initiated by a mobile device is received, at step 420, by the MME. A rejection is communicated to the mobile device at step 430. The rejection is not associated with the identity of the mobile device. Rather, even if the mobile device is valid and would otherwise be authenticated by the HSS, the rejection is communicated to the mobile device because the throttling threshold has been reached.

At step 440, a second attach attempt is initiated by the mobile device. The second attach attempt is associated with a unique identifier. The unique identifier enables the mobile device to be associated with an upper throttling threshold. The throttling threshold is overridden at step 450. The upper throttling threshold allows the mobile device to connect to the LTE network when the throttling threshold has been reached. In other words, the upper throttling threshold is a more relaxed throttling threshold that allows additional attach attempts when mobile devices without the unique identifier are rejected even if they would otherwise be authenticated by the LTE network. In one embodiment, the unique identifier is associated with a high profile user. In one embodiment, the unique identifier is associated with a high paying user. In one embodiment, the unique identifier is associated with a special device (e.g. machine-to-machine).

In one embodiment, LTE access is provided to the mobile device. In one embodiment, the MME receives an indication that an upper throttling threshold has been reached. The upper throttling threshold indicates that additional connections to the LTE network by devices associated with unique identifiers is no longer desirable. In one embodiment, LTE network access is prevented for the mobile device.

Referring now to FIG. 5, a flow diagram depicting an illustrative method 500 of preventing a registration storm in an LTE network, in accordance with an embodiment of the present invention. Initially, at step 510, an authentication failure condition is detected. The authentication failure condition represents a percentage failure associated with network authentications. In one embodiment, the authentication failure condition indicates the authentication failure percentage is one-hundred percent. For example, when a mobile device attempts to attach to the MME for authentication purposes, the MME queries the HSS to get a user profile associated with the mobile device. The MME responds with a key exchange process in order to validate the device. In one embodiment, the MME sends a unique code to the base station indicating an authentication failure condition. In one embodiment, an algorithm associated with the base station detects the authentication failure condition.

Once the authentication failure condition is detected, an algorithm is invoked, at step 520, to initiate a cell barring mode for a base station. In one embodiment, the cell barring mode prevents new user access. This prevents unauthenticated users or devices from authenticating and accessing the LTE network. In one embodiment, the cell barring mode allows already authenticated devices to maintain network access.

At step 530, the algorithm is invoked to detect an authentication failure percentage. In one embodiment, the algorithm is invoked periodically by the base station to determine whether the authentication failure percentage has decreased to a predetermined level. Once the authentication failure percentage has decreased to the predetermined level, in one embodiment, the algorithm is invoked to exit the cell barring mode. In one embodiment, the algorithm is invoked to exit the cell barring mode when an exit cell barring code is received from the MME.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Computer-storage media having computer-executable instructions embodied thereon that, when executed, facilitate a method of preventing a registration storm in an LTE network, the method comprising:
communicating, to an MME, an attach attempt initiated by a mobile device;
receiving a cause code at the mobile device directing the mobile device to refrain from further attach attempts, the cause code protecting network elements associated with the MME from being overloaded;
entering, by the mobile device, an idle mode; and
determining the cause code has expired once the mobile device awakes from the idle mode.

2. The media of claim 1, wherein the cause code further redirects the mobile device to connect to an available service.

3. The media of claim 2, wherein the available service is EVDO.

4. The media of claim 2, wherein the available service is Wi-Fi.

5. The media of claim 2, wherein the available service is a backup MME.

6. The media of claim 1, wherein the cause code protects network elements associated with the MME.

7. The media of claim 1, further comprising communicating, to the MME, a second attach attempt initiated by the mobile device.

8. Computer-storage media having computer-executable instructions embodied thereon that, when executed, facilitate a method of overriding throttled conditions in an LTE network, the method comprising:
communicating, to an MME, an attach attempt initiated by a mobile device;
receiving a rejection at the mobile device, the rejection based, in part, on a throttling threshold having been reached;
communicating, to the MME, a second attach attempt associated with a unique identifier initiated by the mobile device; and
overriding the throttling threshold.

9. The media of claim 8, further comprising providing LTE access to the mobile device.

10. The media of claim 8, wherein the unique identifier is associated with a high profile user.

11. The media of claim 8, wherein the unique identifier is associated with a high paying user.

12. The media of claim 8, wherein the rejection is not associated with the identity of the mobile device.

13. The media of claim 8, further comprising preventing LTE access for the mobile device based, in part, on an upper throttling threshold having been reached.

14. Computer-storage media having computer-executable instructions embodied thereon that, when executed, facilitate a method of preventing a registration storm in an LTE network, the method comprising:
   detecting an authentication failure condition;
   initiating a cell barring mode for a base station; and
   exiting the cell barring mode when an exit cell barring code is received from an MME.

15. The media of claim 14, wherein the initiating a cell barring mode for a base station comprises invoking an algorithm.

16. The media of claim 14, wherein the authentication failure condition is received from the MME.

17. The media of claim 14, further comprising invoking an algorithm to detect an authentication failure percentage.

18. The media of claim 17, further comprising exiting the cell barring mode once the authentication failure percentage decreases to a predetermined level.

19. The media of claim 14, wherein the cell barring mode prevents new user access.

\* \* \* \* \*